(12) United States Patent
Peters et al.

(10) Patent No.: US 8,617,373 B2
(45) Date of Patent: Dec. 31, 2013

(54) CATHODIC ELECTRODEPOSITION PAINT CONTAINING METAL-ORGANIC COMPOUND

(75) Inventors: Verena Peters, Münster (DE); Hubert Baumgart, Münster (DE); Michael Dornbusch, Düsseldorf (DE)

(73) Assignee: BASF Coatings GmbH, Munster (DE)

( * ) Notice: Subject to any disclaimer, the term of this patent is extended or adjusted under 35 U.S.C. 154(b) by 393 days.

(21) Appl. No.: 12/919,870

(22) PCT Filed: Feb. 27, 2009

(86) PCT No.: PCT/EP2009/001402
§ 371 (c)(1),
(2), (4) Date: Nov. 5, 2010

(87) PCT Pub. No.: WO2009/106337
PCT Pub. Date: Sep. 3, 2009

(65) Prior Publication Data
US 2011/0042222 A1 Feb. 24, 2011

(30) Foreign Application Priority Data
Feb. 29, 2008 (DE) .......................... 10 2008 012 085

(51) Int. Cl.
*C25D 13/10* (2006.01)
(52) U.S. Cl.
USPC ............ 204/489; 204/499; 204/486; 524/901
(58) Field of Classification Search
USPC .................. 204/499–506, 489, 486; 523/901
See application file for complete search history.

(56) References Cited

U.S. PATENT DOCUMENTS

| 4,401,774 | A | 8/1983 | Kooymans et al. |
| 5,236,564 | A | 8/1993 | Berg et al. |
| 5,283,124 | A | 2/1994 | Fujibayashi et al. |
| 5,369,150 | A * | 11/1994 | Fujibayashi et al. .......... 523/414 |
| 7,449,095 | B2 * | 11/2008 | Hanatani et al. ............. 204/505 |
| 2004/0220326 | A1 | 11/2004 | Gurtler et al. |
| 2007/0010644 | A1 | 1/2007 | Erickson et al. |

FOREIGN PATENT DOCUMENTS

| DE | 4303787 C1 | 3/1994 |
| DE | 69132197 T2 | 10/2000 |
| EP | 0387878 A2 | 9/1990 |
| EP | 0442362 A2 | 8/1991 |
| EP | 0505445 B1 | 11/1994 |
| EP | 0691797 A1 | 1/1996 |
| EP | 1171530 B1 | 1/2002 |
| EP | 0961797 B1 | 4/2003 |
| WO | WO98/41322 A1 | 9/1998 |
| WO | WO00/34355 A1 | 6/2000 |

OTHER PUBLICATIONS

International Preliminary Report on Patentability for International application No. PCT/EP2009/001402 dated Sep. 28, 2010.
International Search Report for International application No. PCT/EP2009/001402 dated Jul. 6, 2009.
Written Opinion for International application No. PCT/EP2009/001402, dated Jul. 6, 2009.
John Florio, "Metal Catalyzed Urethane Systems"; Paint and Coatings Industry, Oct. 2000, pp. 80-94.
Z. Alex He, Werner J. Blank and Marle E. Picci, "A Selective Catalyst for Two-Component Waterborne Polyurethane Coatings"; Journal of Coatings Technology, vol. 74, No. 930, Jul. 2002, pp. 31-36.

* cited by examiner

*Primary Examiner* — Kishor Mayekar
(74) *Attorney, Agent, or Firm* — Cantor Colburn LLP

(57) ABSTRACT

A cathodic electrodeposition coating material comprising (A) at least one water-dispersible organic binder containing cationic groups, where the cathodic electrodeposition coating material has been admixed with 0.005%-0.5% by weight, based on the solids content of the cathodic electrodeposition coating material, of (B) an organic, tetravalent titanium, zirconium or hafnium complex having one or more oxygen-containing ligands.

14 Claims, No Drawings

CATHODIC ELECTRODEPOSITION PAINT CONTAINING METAL-ORGANIC COMPOUND

This application is a National Phase Application of Patent Application PCT/EP2009/001402 filed on 27 Feb. 2009, which claims priority to DE 10 2008 012 085.5, filed 29 Feb. 2008, both of which are hereby incorporated by reference in their entirety.

FIELD OF THE INVENTION

The present invention relates to a cathodic electrodeposition coating material comprising at least one water-dispersible organic binder containing cationic groups and comprising an organometallic compound of an element from transition group 4 of the Periodic Table. The present invention further relates to a process for preparing the cathodic electrodeposition coating material and to its use to coat substrates. The present invention additionally relates to a substrate coated with the cathodic electrodeposition coating material, and to its production.

BACKGROUND OF THE INVENTION

Organometallic compounds of elements from transition group 4 are known. They are used, for example, as crosslinking catalysts in the preparation of polyurethanes, more particularly in solvent-based systems.

WO 98/41322 A1 describes various organometallic complexes of zirconium and hafnium. They are used for producing (poly)urethanes for adhesives, foams, coatings, sealants, and plastic goods which are produced, for example, by a spraygun process and by an injection molding process. The formulations of WO 98/41322 A1 are based without exception on organic solvents.

US 2004/0220326 A1 describes catalysts for urethane crosslinking in aqueous two-component polyurethane coating materials. Used for this purpose are organic metal complexes from transition groups 5 and 6.

WO 00/34355 describes Lewis acid catalysts, including organometallic compounds of various main group and transition group elements. They are used for producing curable, uretdione-containing compositions which cure at low temperatures. These compositions are more particularly powder coating materials.

US 2007/0010644 A1 describes the production of elastomers. Through the simultaneous use of two different catalysts, including an organic metal complex, relatively fast-curing elastomers are obtained which on injection exhibit fewer dripping losses, and whose elastomeric products can be demolded after a shorter time.

He et al. (Journal of Coatings Technology 2002, 74 (930), 31-36) describe a two-component polyurethane (2-K-PU) system that comprises metal carboxylates or metal β-diketonates. The rate of urethane formation by butyl isocyanate with 2-ethylhexanol is investigated, in comparison to the formation of urea with water. In this system, zirconium compounds prove to be good catalysts of urethane formation. As described, however, the zirconium diketones are hydrolyzed over time in the aqueous system, leading to deactivation of the zirconium catalyst in the aqueous medium. The coating is applied to the substrate by drawing with a wire applicator before subsequent curing. He et al. further describe the use of a zirconium diketonate in a clearcoat material based on a polyester dispersion, and in a solventborne two-component acrylate emulsion. In these cases an improved gloss)(20°) is achieved in the resulting coating.

Florio et al. (Paint and Coatings Industry 2000, 16, 80-94) describe various tin-free organic catalysts of urethane formation, including organic compounds of bismuth, aluminum, and zirconium. This series of organometallic compounds is available commercially under the "K-KAT®" designation. Florio et al. describe suitable fields for use of these bismuth, aluminum, and zirconium compounds. While the bismuth compounds (K-KAT 348, K-KAT XC-B203) appear suitable for use in electrodeposition coatings, the problem of catalyst deactivation by hydrolysis must be borne in mind as a general consideration. Deactivation of the catalysts used may occur specifically due to water and anions, more particularly phosphate ions, and may not become apparent in the coating product until after a few days. Polyether polyols, for example, may comprise phosphate ions as a contaminant from the production process. As Florio et al. describe, phosphate ions can induce the deactivation of the stated catalysts, more particularly that of zirconium catalysts.

Cathodically depositable electrodeposition coating materials are suitable for use in cathodic electrodeposition coating (cathodic electrocoat). Cathodic electrocoat is a coating process frequently employed in particular for priming, where binders which carry cationic groups, in dispersion or solution in water, are applied using direct current to electrically conducting articles. For that purpose the substrate for coating is connected as a cathode and is immersed into the cathodically depositable electrodeposition coating material. When a direct current is applied between the substrate, connected as the cathode, and an anode which is likewise situated in the electrodeposition coating material, the charged paint micelles or dispersion particles pass, within a diffusion-controlled boundary layer, to the oppositely charged electrode, where they are precipitated through pH change resulting from the electrolytic decomposition of the water. If the surface charge of the paint micelles or dispersion particles is positive, deposition occurs on the cathode, i.e., on the substrate connected as the cathode. The paint film deposited has a high solids content and, following the removal of the substrate from the dipping tank, and optional cleaning steps, is typically crosslinked by baking.

The cathodically depositable electrodeposition coating materials that are in use nowadays customarily meet exacting requirements in terms of corrosion protection, edge protection, surface quality, and other properties, such as sandability, for example. A further requirement, however, is that a cathodic dip coating should have very few craters (crater-shaped film defects with depressions which can reach down almost to the substrate, and which remain after drying). Craters are formed more particularly in the presence of a contaminant whose surface tension is lower than that of the paint film. Immediately after deposition, no craters are apparent. They only appear in conjunction with the flow phenomena during the baking operation. Defects of this kind in a cathodic electrodeposition coating may possess diameters of up to several millimeters. Often they can still be perceived on the paint surface after topcoating has taken place, and they therefore entail laborious and costly afterwork.

In spite of a very wide variety of technical measures, such as reducing the film thickness, raising the pigment content of the electrocoat material, increasing the paint viscosity, and thoroughly cleaning and degreasing the substrates, for example, it has to date not proved possible to reliably avoid these defects. A tendency toward cratering appears to be especially pronounced more particularly in cathodic electrocoat materials that contain tin catalyst. One particular source of disruption is the contamination of the cathodic electrocoat bath with phosphate ions. The substrates used for cathodic electrocoating are typically pretreated by means of a phosphating operation. The phosphated substrates are then introduced into the electrocoat bath for coating. Owing to phosphate entrainments from the pretreatment operation, therefore, the cathodic electrocoat bath may be affected by phosphate ion contamination which is virtually unavoidable by conventional means. This problem exists more particularly in the painting lines that are typically used in the industrial cathodic electrodeposition coating process.

The object, therefore, is to provide a cathodic electrodeposition coating material that exhibits a reduced tendency to form craters, with the consequence that a very largely crater-free coating can be obtained even, more particularly, in the case of the cathodic electrocoating with phosphated substrates and the attendant possibility of contamination of the cathodic electrocoat bath with phosphate ions. This allows laborious and costly afterwork to be avoided and hence can make the production of correspondingly coated substrates more time-efficient and cost-effective.

SUMMARY OF THE INVENTION

This object is achieved, surprisingly, through the provision of a cathodic electrodeposition coating material comprising (A) at least one water-dispersible organic binder containing cationic groups, where the cathodic electrodeposition coating material has been admixed with 0.005%-0.5% by weight, based on the solids content of the cathodic electrodeposition coating material, of (B) an organic, tetravalent titanium, zirconium or hafnium complex having one or more oxygen-containing ligands.

DETAILED DESCRIPTION OF AN EMBODIMENT OF THE INVENTION

The cathodic electrodeposition coating material of the invention is admixed with 0.005%-0.5%, preferably 0.025%-0.25%, more preferably 0.05%-0.15%, by weight, based on the solids content of the electrocoat material, of an organic, tetravalent titanium, zirconium or hafnium complex having one or more oxygen-containing ligands.

If less than 0.005% by weight, based on the solids content of the cathodic electrocoat material, of the organic, tetravalent titanium, zirconium or hafnium complex having one or more oxygen-containing ligands is used, then the crater prevention effect of the invention is too weak.

If more than 0.5% by weight, based on the solids content of the cathodic electrocoat material, of the organic, tetravalent titanium, zirconium or hafnium complex having one or more oxygen-containing ligands is used, then, besides difficulties associated with the homogeneous incorporation of the complex into the mixture and undesirably high costs, there may also be deleterious effects on the surface nature of the film, such as increased roughness, for example.

Preferably at least one oxygen-containing ligand is an alkanolate or enolate, more particularly an enolate derived from diketones. With particular preference the oxygen-containing ligand is a bidentate or multidentate ligand. More preferably still this ligand is an enolate derived from a β-diketone. With very particular preference the ligand is acetylacetonate.

Very particularly preferred metal complexes (B) used are zirconium acetylacetonate, hafnium acetylacetonate or titanium acetylacetonate.

The metal complex (B) is preferably a zirconium complex or a hafnium complex. A multiplicity of corresponding zirconium complexes are easily obtainable. Corresponding hafnium complexes are notable for their particularly high stability.

The metal complexes (B) are used preferably in cathodic electrocoat materials admixed additionally with at least one suitable, tin-containing crosslinking catalyst. The cathodic electrocoat materials have preferably been admixed with a dialkyltin oxide, more preferably dioctyltin oxide, and more preferably still dibutyltin oxide. The tin-containing crosslinking catalyst has been added to the cathodic electrocoat material preferably in the customary and known proportions, typically in a fraction of 0.1%-10%, preferably of 0.3%-5%, more preferably of 0.5%-3%, by weight, based on the solids content of the cathodic electrocoat material. Too small a proportion of the catalyst can lead to deficient crosslinking; too high a proportion gives rise to high costs and impairs the grindability of the pastes, in conjunction with inadequate solubility in the binder.

The cathodic electrocoat material of the invention preferably has a solids content of 12%-25%, more preferably of 15%-22%, with more particular preference of 18%-20%, by weight, based in each case on the overall cathodic electrocoat material of the invention. The solids content is determined as the nonvolatile mass fraction after drying at 180° C. for 30 minutes.

The cathodic electrocoat material of the invention preferably has a pH of 4.8-6.5, more preferably of 5.2-6.2, with more particular preference of 5.5-6.0. The pH can be determined using the methods that are known and are typically used for that purpose, such as by potentiometry, for example.

The cathodic electrocoat material the invention preferably has an electrical conductivity of 0.8-2.5 mS/cm, more preferably of 1.1-2.3 mS/cm, with more particular preference of 1.3-1.9 mS/cm. The conductivity can be determined using the methods that are known and typically used for that purpose.

The cathodic electrocoat material of the invention contains preferably 60%-95%, more preferably 75%-90%, with more particular preference 80%-85%, by weight, based on the solids content of the cathodic electrocoat material, of at least one water-dispersible organic binder (A) containing cationic groups. The selection of the binder or binders (A) is in principle not subject to any restrictions, and so in principle any water-dispersible organic binder containing cationic groups is suitable.

Preferably at least one binder (A) contains primary, secondary, tertiary or quaternary amino and/or ammonium groups.

As binders (A) it is particularly preferred to use amine-modified epoxy resins.

Examples of suitable amine-modified epoxy resins are the adducts of modified or unmodified polyepoxides with primary or secondary amines (described, for example, in EP 1171530 A1, page 8 line 10 to page 9 line 2, and in U.S. Pat. No. 5,236,564, page 1 line 44 to page 3 line 49).

Examples of suitable polyepoxides are polyglycidyl ethers obtainable from polyphenols and epihalohydrin, more particularly epichlorohydrin. Preferred polyphenols are, more particularly, bisphenol A and bisphenol F. Further suitable polyphenols are, for example, 4,4"-dihydroxybenzophenone, 1,1-bis(4-hydroxyphenyl)ethane, 1,1-bis(4-hydroxyphenyl) isobutane, 2,2-bis(4-hydroxy-tert-butylphenyl)propane, bis (2-hydroxynaphthyl)methane, 1,5-dihydroxynaphthalene, and phenolic novolak resins. Further suitable polyepoxides are polyglycidyl ethers of polyhydric alcohols, such as ethylene glycol, diethylene glycol, triethylene glycol, 1,2-propylene glycol, 1,4-propylene glycol, 1,5-pentanediol, 1,2,6-hexanetriol, glycerol, and 2,2-bis(4-hydroxycyclohexyl)propane, for example. Use may also be made of polyglycidyl esters of polycarboxylic acids, such as oxalic acid, succinic acid, glutaric acid, terephthalic acid, hexahydrophthalic acid, isophthalic acid, and 2,6-naphthalenedicarboxylic acid, for example. Further suitable are hydantoin epoxides, epoxidized polybutadiene, and polyepoxide compounds obtained by epoxidizing an olefinically unsaturated aliphatic compound.

Modified polyepoxides are polyepoxides in which some of the reactive groups have been reacted with a modifying compound. Examples of modifying compounds include the following:

a) compounds containing carboxyl groups, such as saturated or unsaturated monocarboxylic acids (e.g., benzoic acid, 2-ethylhexanoic acid, Versatic acid), aliphatic, cycloaliphatic and/or aromatic dicarboxylic acids of different chain lengths (e.g., adipic acid, sebacic acid, isophthalic acid or dimeric fatty acids), hydroxyalkylcarboxylic acids (e.g., lactic acid, dimethylolpropionic acid), and also carboxyl-containing polyesters, or b) compounds containing amino groups, such as diethylamine or ethylhexylamine or diamines with secondary amino groups, e.g., N,N'-dialkylalkylenediamines, such as dimethylethylenediamine, N,N'-dialkylpolyoxyalkylenamines, such as N,N'-dimethylpolyoxypropylenediamine, cyanoalkylated alkylenediamines, such as N,N'-bis(cyanoethyl)ethylenediamine, cyanoalkylated polyoxyalkylenamines, such as N,N'-bis(cyanoethyl)polyoxypropylenediamine, polyaminoamides, such as Versamides, for example, more particularly amino-terminated reaction products of diamines (e.g., hexamethylenediamine), polycarboxylic acids, more particularly dimer fatty acids, and monocarboxylic acids, more particularly fatty acids, or the reaction product of one mole of diaminohexane with two moles of monoglycidyl ether or monoglycidyl ester, especially glycidyl esters of alpha-branched fatty acids such as Versatic acid, or c) compounds containing hydroxyl groups, such as neopentyl glycol, bisethoxylated neopentyl glycol, neopentyl glycol hydroxypivalate, dimethylhydantoin-N,N'-diethanol, hexane-1,6-diol, hexane-2,5-diol, 1,4-bis(hydroxymethyl)cyclohexane, 1,1-isopropylidenebis(p-phenoxy)-2-propanol, trimethylolpropane, pentaerythritol, or amino alcohols, such as triethanolamine, methyldiethanolamine or hydroxyl-containing alkylketimines, such as aminomethylpropane-1,3-diol methylisobutyl ketimine or tris(hydroxymethyl)aminomethane cyclohexanone ketimine, and also polyglycol ethers, polyester polyols, polyether polyols, polycaprolactone polyols, and polycaprolactam polyols of different functionalities and molecular weights, or d) saturated or unsaturated fatty acid methyl esters which are transesterified in the presence of sodium methoxide with hydroxyl groups of the epoxy resins.

Primary and/or secondary amines suitable for forming adducts with polyepoxides are, for example, mono- and dialkylamines, such as methylamine, ethylamine, propylamine, butylamine, dimethylamine, diethylamine, dipropylamine, methylbutylamine, and the like. Likewise suitable are alkanolamines, such as methylethanolamine, diethanolamine, and the like, for example. Suitability is further possessed by dialkylaminoalkylamines, such as dimethylaminoethylamine, diethylaminopropylamine, dimethylaminopropylamine, and the like, for example. In the majority of cases, low molecular mass amines are used, though it is also possible to employ monoamines of higher molecular mass. The amines may also contain other groups as well, but these groups ought not to disrupt the reaction of the amine with the epoxide group and also not lead to any gelling of the reaction mixture. For forming adducts with polyepoxides it is preferred to use secondary amines.

The charges needed for electrical deposition can be generated by protonation with water-soluble acids (e.g., boric acid, formic acid, lactic acid, acetic acid).

Another possibility for the introduction of cationic groups is the reaction of epoxide groups with amine salts.

The amine-modified epoxy resins can be used either as externally crosslinking synthetic resins or as self-crosslinking synthetic resins. Self-crosslinking synthetic resins can be obtained, for example, by chemical modification of the amine-modified epoxy resins, for example, by reacting the amine-modified epoxy resin with a partially blocked polyisocyanate which possesses on average one free isocyanate group per molecule and whose blocked isocyanate groups are deblocked only at elevated temperatures.

As binders it is preferred to use externally crosslinking, amine-modified epoxy resins in combination with a suitable crosslinking agent. Examples of suitable crosslinkers are phenolic resins, polyfunctional Mannich bases, melamine resins, benzoguanamine resins, and blocked polyisocyanates. Blocked polyisocyanates are used with preference as crosslinkers in the binder.

The cathodic electrocoat material of the invention contains preferably 18% to 28%, more preferably 22%-27%, with more particular preference 24%-26%, by weight, based on the solids content of the electrocoat material, of at least one blocked (poly)isocyanate as crosslinker.

Blocked polyisocyanates which can be used are any polyisocyanates in which the isocyanate groups have been reacted with a compound, so that, with respect to hydroxyl groups and amine groups, the blocked polyisocyanate formed is stable at room temperature but reacts at elevated temperatures, generally in the range from about 90° C. to about 300° C. In the preparation of the blocked polyisocyanates it is possible to use any desired organic polyisocyanates that are suitable for crosslinking. Preference is given to the isocyanates containing about 3 to 36, more particularly about 8 to about 15, carbon atoms. Examples of suitable diisocyanates are hexamethylenediisocyanate, tolylene 2,4-diisocyanate, tolylene 2,6-diisocyanate, and 1-isocyanatomethyl-5-isocyanato-1,3,3-trimethylcyclohexane. Polyisocyanates of higher isocyanate functionality can also be used. Examples of such are trimerized hexamethylene diisocyanate and trimerized isophorone diisocyanate. Mixtures of polyisocyanates can also be used, furthermore. The organic polyisocyanates suitable as crosslinking agents in the context of the invention may also be prepolymers, deriving, for example, from a polyol, including a polyether polyol or a polyester polyol.

For the blocking of the polyisocyanates it is possible to use any desired suitable aliphatic, cycloaliphatic or aromatic alkyl monoalcohols. Examples of such are aliphatic alcohols, such as methyl, ethyl, chloroethyl, propyl, butyl, amyl, hexyl, heptyl, octyl, nonyl, 3,5,5-trimethylhexyl, decyl, and lauryl alcohol; cycloaliphatic alcohols, such as cyclopentanol and cyclohexanol; and aromatic alkyl alcohols, such as phenylcarbinol and methylphenylcarbinol.

Other suitable blocking agents are hydroxylamines, such as ethanolamine, oximes, such as methyl ethyl ketone oxime, acetone oxime, and cyclohexanone oxime, or amines, such as dibutylamine and diisopropylamine. The stated polyisocyanates and blocking agents can also be used, given appropriate proportions, for the preparation of the abovementioned partially blocked polyisocyanates.

Very particular preference is given to using at least one binder (A) which is present in an aqueous binder dispersion which is obtainable by i) reacting 1) a precursor preparable, with addition of phosphines and/or phosphine salts as catalyst, from a) a diepoxide compound or mixture of diepoxide compounds and b) monophenol, diphenol or a mixture of mono- and diphenols
  2) with one or more organic amines, at addition temperatures reduced to 60 to 130° C., to give an epoxide-amine adduct,
ii) subsequently or simultaneously reacting the secondary hydroxyl groups that have been formed in the reaction of components a) and b) with epoxide groups of the epoxide-amine adduct prepared in stage i), at a temperature of 110 to 150° C.,
iii) adding a crosslinking agent or a mixture of different crosslinking agents at a temperature of <150° C.,
iv) neutralizing, and
v) dispersing the mixture obtained in stages i) to iv) in water.

This binder dispersion is described in EP 0691797 B1.

The cathodic electrocoat material of the invention may comprise further additives such as, for example, crosslinkers, pigments, plasticizers, fillers, and wetting agents. More particularly the cathodic electrocoat material of the invention may comprise one or more crosslinkers and/or one or more pigments.

The cathodic electrocoat material of the invention contains preferably 5%-40%, more preferably 10%-25%, with more particular preference 15%-20%, by weight, based on the solids content of the electrocoat material, of at least one pigment.

Examples of suitable pigments are white pigments such as titanium dioxide, aluminum silicate, silicon dioxide, zinc oxide, zinc sulfide, barium sulfate, calcium carbonate, magnesium carbonate, and magnesium silicate, or black pigments, such as carbon black, or else colored pigments, for example. The colored pigments include, for example, inorganic chromatic pigments, such as iron oxides or chromium oxides, and organic chromatic pigments, such as azo pigments, triphenylmethane pigments, indigoid pigments, metal complex pigments, isoindolinones, anthraquinones, perylene and perinone pigments, dioxazine pigments, quinophthalones, diketopyrrolopyrrole or pyrazoloquinazolone pigments, for example.

The present invention further provides a process for preparing the cathodic electrodeposition coating material of the invention. The cathodic electrodeposition coating material of the invention can be prepared by i) dispersing at least one water-dispersible organic binder (A) containing cationic groups in an aqueous solution to give an aqueous binder dispersion, ii) mixing the aqueous binder dispersion with (B) 0.005%-0.5% by weight, based on the solids content of the cathodic electrodeposition coating material, of an organic, tetravalent titanium, zirconium or hafnium complex having one or more oxygen-containing ligands, and iii) if desired, introducing further additives. The sequence of steps i)-iii) is not mandatory. The process of the invention may be used for preparing any of the above-described embodiments of the electrocoat material of the invention.

Pigments are incorporated preferably in the form of a pigment paste into the aqueous binder dispersion, with stirring. The preparation of pigment pastes is general knowledge and is described in EP 0505445 B1, for example.

The present invention further provides for the use of the cathodic electrodeposition coating material of the invention. The cathodic electrodeposition coating material of the invention can be used to coat electrically conductive substrates by means of cathodic electrodeposition coating. The cathodic electrodeposition coating material of the invention is used preferably to coat metallic substrates, such as substrates of steel, aluminum, copper, alloys thereof, or the like, for example; more preferably to coat phosphated metallic substrates; more preferably still to coat phosphated steel; and, with very particular preference, to coat motor vehicle bodies or parts thereof.

Examples of metallic substrates that are suitable are substrates of steel, aluminum, copper, alloys of different metals, or the like. It is preferred to use steel substrates. Particular preference is given to using phosphated metallic substrates, more particularly substrates of phosphated steel. Phosphated metallic substrates are metallic substrates which have been given inorganic conversion coats containing phosphate by means of appropriate chemical pretreatment. Particularly preferred such substrates are motor vehicle bodies or parts thereof.

The present invention additionally provides, therefore, a substrate coated with the cathodic electrodeposition coating material of the invention, more particularly a metallic substrate, such as a substrate of steel, aluminum, copper, alloys of different metals, or the like, for example, preferably a substrate of phosphated metal, more particularly of phosphated steel. Very particular preference is given to motor vehicle bodies or parts thereof that are coated with the cathodic electrodeposition coating material of the invention.

The present invention therefore further provides a process for producing a metallic substrate coated with the cathodic electrodeposition coating material of the invention. Preferably the metallic substrate is first phosphated and then coated in a cathodic electrodeposition coating process with the cathodic electrodeposition coating material of the invention.

The phosphating may take place by the known and customary methods. Methods of iron phosphating or trication zinc phosphating, for example, may be employed. The metallic substrate, more particularly steel, is preferably zinc phosphated.

The temperature of the electrocoat bath ought typically to be between 15 to 40° C., preferably between 25 and 35° C. The voltage applied can vary within a wide range and may be, for example, between 50 and 500 volts. Typically, however, voltages between 250 and 400 volts are operated. Following deposition, the coated article is rinsed and is ready for baking. The deposited paint films are baked generally at temperatures of 130 to 220° C. over a period of 8 to 60 minutes, preferably at 150 to 180° C. over a period of 12 to 30 minutes.

The invention is illustrated in the examples which follow. All references to parts and percentages are by weight unless expressly noted otherwise.

WORKING EXAMPLES

Preparation Example 1

Crosslinker

The crosslinker from EP 0961797 B1 (page 6 lines 43-52) is used. A reactor equipped with a stirrer, reflux condenser, internal thermometer, and inert gas entry line is charged with 1084 g of isomers and polyfunctional oligomers based on 4,4'-diphenylmethane diisocyanate, with an NCO equivalent weight of 135 (Basonat$^R$ A270, BASF; NCO functionality about 2.7; diphenylmethane 2,2'- and 2,4'-diisocyanate content below 5%) under a nitrogen atmosphere. 2 g of dibutyltin laurate are added and 1314 g of butyl diglycol are added dropwise at a rate such that the temperature of the product remains below 70° C. Cooling may be necessary. After the end of the addition, the temperature is held at 70° C. for a further 120 min. On subsequent checking, NCO groups are no longer detectable. The batch is cooled to 65° C.

The solids content is >97% (1 h at 130° C.).

Preparation Example 2

Binder Dispersion

The binder dispersion A from EP 0961797 B1 (page 7 lines 4-30) is used. A laboratory reactor heated with heat transfer oil and equipped with stirrer, reflux condenser, thermometer and inert gas inlet tube is charged with 1128 parts of a commercial epoxy resin based on bisphenol A, having an epoxide equivalent weight (EEW) of 188, 262 parts of dodecylphenol, 31.4 parts of xylene, and 228 parts of bisphenol A, and this initial charge is heated to 127° C. under nitrogen. With stirring, 1.6 g of triphenylphosphine are added, whereupon there is an exothermic reaction and the temperature climbs to 160° C. The reaction mixture is cooled to 130° C. again and then its epoxide content is checked. The EEW of 532 indicates that >98% of the phenolic OH groups have reacted. Then 297.5 parts of Pluriol P 900 (polypropylene glycol MW 900, BASF) are added with simultaneous cooling. 5 minutes later, with further cooling, at 120° C., 105 parts of diethanolamine are added. When, after a brief exotherm ($T_{max}$ 127° C.), the temperature has dropped to 110° C. (30 min), 51 parts of N,N-dimethylaminopropylamine are added. After a brief exotherm ($T_{max}$ 140° C.) the batch is reacted further at 130° C. for two hours until the viscosity remains constant (1.8 dPas, cone/plate viscometer at 23° C., 40% strength in Solvenon PM (BASF)). At that point, with simultaneous cooling, 58.5 parts of butyl glycol and 887.8 parts of the crosslinker (preparation example 1) are added and the product is discharged at 105° C. 2100 parts of the mixture, which is still hot, are immediately dispersed in a pre-prepared mixture of 1945 parts of fully demineralized water (FD water) and 33.1 parts of glacial acetic acid, with intense stirring. Following brief homogenization, the product is diluted with a further 1404 parts of FD water and filtered on a K 900 plate filter (Seitz). The characteristics of the dispersion are as follows:
Solids (1 h at 130° C.): 35.7%
MEQ base=0.657 meq/g resin solids
MEQ acid=0.283 meq/g resin solids
pH=5.4
Average particle size=1250? (light scattering method)
Sedimentation stability=no sediment after 3-month storage time at room temperature
Viscosity=14 sec (DIN4 cup at 23° C.)

Preparation Example 3

Grinding Resin

The grinding resin A from EP 0961797 (page 9 lines 17-21) is used. A reactor equipped with stirrer mechanism, internal thermometer, nitrogen inlet, and water separator with reflux condenser is charged with 30.29 parts of an epoxy resin based on bisphenol A and having an epoxide equivalent weight (EEW) of 188, 9.18 parts of bisphenol A, 7.04 parts of dodecylphenol, and 2.37 parts of butyl glycol. This initial charge is heated to 110° C., 1.85 parts of xylene are added, and are distilled off again under a weak vacuum together with possible traces of water. Then 0.07 part of triphenylphosphine is added and the mixture is heated to 130° C. After an exothermic increase in temperature to 150° C., reaction is continued at 130° C. for 1 h. The EEW of the reaction mixture at that point is 860. It is cooled and, during cooling, is admixed with 9.91 parts of butyl glycol and 17.88 parts of a polypropylene glycol diglycidyl ether with an EEW of 333 (DER 732, Dow Chemicals). At 90° C. 4.23 parts of 2-(2'-aminoethoxy)ethanol ($H_2N$—$CH_2$—$CH_2$—O—$CH_2$—$CH_2$—OH) and, 10 minutes later, 1.37 parts of N,N-dimethylaminopropylamine are added. After a brief exotherm, the reaction mixture is held at 90° C. for 2 h until the viscosity remains constant, and is then diluted with 17.66 parts of butyl glycol. The resin has a solids of 69.8% (measured 1 h at 130° C.) and a viscosity of 5.5 dPas (measured on a resin solution diluted to 40% strength with propylene glycol monomethyl ether (Solvenon PM, BASF) on a cone/plate viscometer at 23° C.).

Preparation Example 4

Aqueous Pigment Paste

In accordance with the method described in EP 0505445 B1 (page 10 lines 35-41) an aqueous pigment paste is prepared from the starting materials listed in EP 0961797 (page 9, table 1, pigment paste B). For this purpose, first of all, 27.1 parts of deionized water and 25 parts of the grinding resin from preparation example 3 are formed into a premix. Then 6 parts of aluminum silicate, 0.6 part of carbon black (beaded), 38.1 parts of titanium dioxide, and 2.7 parts of dibutyltin oxide are added and the system is mixed for 30 minutes under a high-speed dissolver stirrer. Subsequently the mixture is dispersed in a small laboratory mill for 1 to 1.5 h down to a Hegmann fineness of less than 12.

Comparative Example 1 and Inventive Example 1

Cathodic Electrodeposition Coating Materials

To prepare conventional (comparative example 1) and inventive (inventive example 1) cathodic electrodeposition coating materials, 2006 parts of the binder dispersion from preparation example 2, 603 parts of the aqueous pigment paste from preparation example 4, and 2391 parts of deionized water are combined to form the electrocoating bath. The procedure here is to introduce the binder dispersion initially and to dilute it with deionized water. Subsequently the pigment paste is introduced with stirring. The values reported are weight fractions (g). Additionally, to prepare the electrocoat materials of the invention, 100 ppm, 200 ppm or 300 ppm, based on the electrocoat material as a whole, of zirconium (IV) acetylacetonate are added to the electrocoat material.

The cathodic electrocoat material is left to age for 3 days at room temperature with stirring before being used for cathodic electrodeposition coating. The dip bath has a pH of 5.85 and a conductivity of 1.84 mS/cm. The paint films are deposited over 2 minutes, with a deposition voltage of 220 volts and a breakthrough voltage of 350 volts, with a bath temperature of 29° C., onto cathodically connected, zinc-phosphated, L-shaped steel test panels without a Cr(VI) afterrinse in the pretreatment. The L-shaped test panels are introduced into the electrocoat bath in such a way that part of the panel is disposed vertically and another part of the panel horizontally in the bath. In some cases, following deposition of the paint film, the test panels are not removed from the bath immediately but instead are left in the bath for a further 15 minutes. In all cases the deposited paint films (film thickness 21 μm) are rinsed with deionized water and baked at 175° C. (panel temperature) for 15 minutes.

Test for Cratering Tendency

After the coating of the test panels from comparative example 1, the cathodic electrocoat material from comparative example 1 is admixed with 100 ppm of disodium hydrogen phosphate and stirred for 24 h. The pH is then adjusted to 5.5 using formic acid. To prepare the electrocoat materials of the invention, 100 ppm, 200 ppm or 300 ppm, based on the overall electrocoat material, of zirconium(IV) acetylacetonate are added additionally to the electrocoat material. Subsequently the conventional and inventive electrocoat materials are stirred again for 24 h prior to deposition of paint films as described above. After baking, the number of craters over an area of 10×10 cm of the part of the test panel mounted horizontally in the cathodic electrocoat bath is assessed. The results are set out in table 1.

TABLE 1

| cathodic electrocoat material | conventional | inventive Zirconium(IV) acetylacetonate | | |
|---|---|---|---|---|
| | | 100 ppm | 200 ppm | 300 ppm |
| pH | 5.85 | 5.84 | 5.85 | 5.85 |
| Conductivity | 1.84 | 1.83 | 1.81 | 1.78 |
| L panel | no craters | no craters | no craters | no craters |
| L panel + 15 min in the bath | no craters | no craters | no craters | no craters |
| +100 ppm Na$_2$HPO$_4$ + formic acid to adjust the pH to 5.5 | | | | |
| L panel | >100 craters | <100 craters | <10 craters | no craters |
| L panel + 15 min in the bath | >1000 craters | <100 craters | <100 craters | <10 craters |

The results show that, in the case of cathodic electrocoating in phosphate-contaminated cathodic electrocoat baths, the number of craters is significantly reduced when using the cathodic electrocoat material of the invention as compared with the use of a conventional cathodic electrocoat material.

Under real-life conditions, when coating phosphated substrates, phosphate contamination of the electrocoat bath must always be considered, since, despite careful rinsing of the phosphated substrates, it is impossible to prevent the entrainment of phosphate ions on the surface of the phosphated substrates into the electrocoat bath. An "ideal" composition, in other words, in this case, phosphate-free composition of the electrocoat bath, like that likewise investigated in the above examples (no craters), does therefore not exist under real-life conditions.

What is claimed is:

1. A cathodic electrodeposition coating material comprising
    (A) at least one water-dispersible organic binder containing cationic groups, wherein the cathodic electrodeposition coating material has been admixed with 0.005%-0.25% by weight, based on the solids content of the cathodic electrodeposition coating material, of
    (B) at least one organic tetravalent zirconium complex having one or more oxygen-containing ligands.

2. The coating material of claim 1, wherein the at least one organic tetravalent complex comprises at least one oxygen-containing ligand selected from the group consisting of bidentate ligands and multidentate ligands.

3. The coating material of claim 1, wherein the at least one organic tetravalent complex comprises at least one oxygen-containing ligand selected from the group consisting of an alkanolate and an enolate.

4. The coating material of claim 3, wherein the at least one oxygen-containing ligand comprises an enolate derived from a β-diketone.

5. The coating material of claim 1, wherein the at least one organic tetravalent zirconium complex having one or more oxygen-containing ligands (B) comprises zirconium acetylacetonate.

6. The coating material of claim 1 wherein the coating material has been admixed additionally with at least one tin-containing crosslinking catalyst suitable for cathodic electrodeposition coating materials.

7. The coating material of claim 6, wherein the at least one tin-containing crosslinking catalyst comprises at least one of dibutyltin oxide or dioctyltin oxide.

8. The coating material of claim 1, wherein the binder (A) comprises an amine-modified epoxy resin.

9. A process for preparing the cathodic electrodeposition coating material of claim 1, comprising
    i) dispersing at least one water-dispersible organic binder (A) containing cationic groups in an aqueous solution to give an aqueous binder dispersion,
    ii) mixing the aqueous binder dispersion with (B) 0.005%-0.25% by weight, based on the solids content of the cathodic electrodeposition coating material, of at least one organic tetravalent zirconium complex having one or more oxygen-containing ligands, and
    iii) optionally, introducing further additives.

10. A method of coating an electrically conductive metallic substrate, comprising
    applying the cathodic electrodeposition coating material of claim 1 to the electrically conductive metallic substrate by means of cathodic electrodeposition coating.

11. The method of claim 10, wherein the electrically conductive metallic substrate comprises a phosphated metallic substrate.

12. The method of claim 11, wherein the electrically conductive metallic substrate comprises a phosphated steel substrate.

13. The method of claim 10, wherein the electrically conductive metallic substrate comprises a motor vehicle body or a part thereof.

14. The method of claim 10 further comprising phosphating the electrically conductive metallic substrate before applying the coating material of claim 1.

* * * * *